Feb. 16, 1943.  W. H. FERGUSON  2,311,042
HOLDING DEVICE FOR AUTOMOBILE BODY PARTS
Filed Aug. 2, 1940
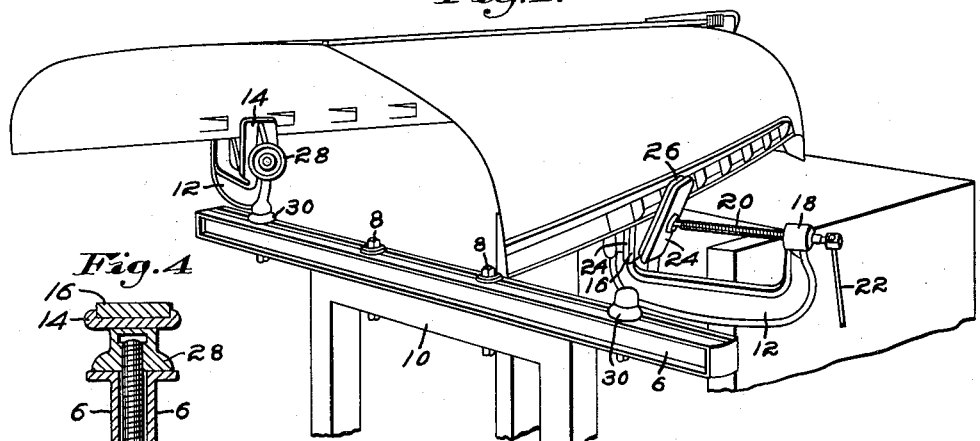
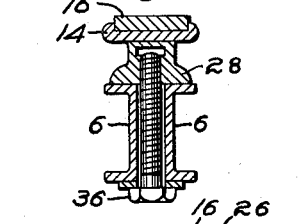
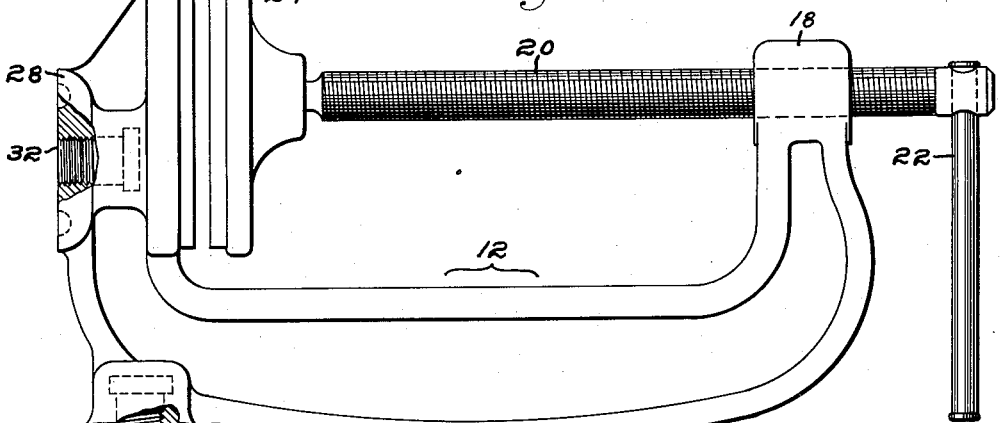
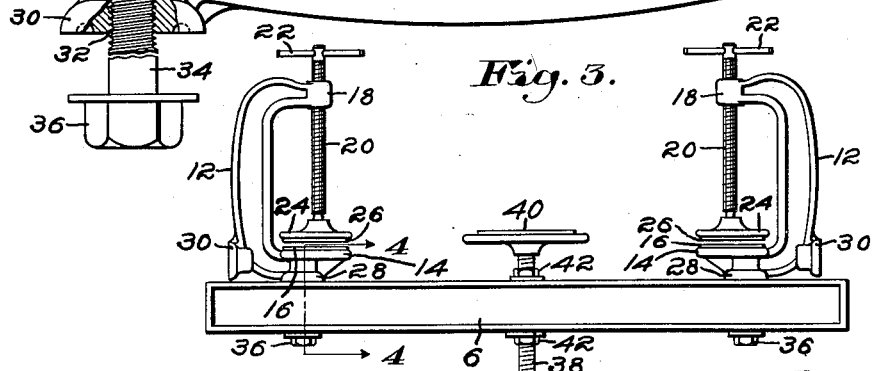
Inventor:
William H. Ferguson, Patented Feb. 16, 1943

2,311,042

UNITED STATES PATENT OFFICE 2,311,042

HOLDING DEVICE FOR AUTOMOBILE BODY PARTS

William H. Ferguson, Flint, Mich.

Application August 2, 1940, Serial No. 349,896

5 Claims. (Cl. 29—89)

This invention relates to a holding device for positioning automobile body parts when repair work is to be done thereon, in particular for pushing and pulling operations incident to the repositioning of parts dented, bent or otherwise damaged by collision or like casualty. The object is to provide an efficient and simple device for this purpose having a wider range of use and application to meet various exigencies of use than those hitherto known.

My invention will be well understood by reference to the following description of an illustrative embodiment thereof shown by way of example in the accompanying drawing, wherein:

Fig. 1 is a perspective view showing a device illustrative of the invention holding an automobile hood;

Fig. 2 is a side elevation on an enlarged scale showing one of the clamps utilized in Fig. 1;

Fig. 3 is an elevation showing another arrangement of the parts illustrated in Fig. 1; and Fig. 4 is a section on the line 4—4 of Fig. 3 on an enlarged scale.

Referring to Fig. 1, I have there shown an automobile hood of the so-called alligator type clamped in position for repair by means of a construction exemplifying the invention. In that figure I show a rigid slotted beam 6 which, as best seen in Fig. 4, consists essentially of two channels placed back to back and defining between them the longitudinal slot. In Fig. 1 this beam 6 is mounted by means of bolts 8 extending through the slot and the slotted cross-bar 10 of a standard forming a part of an ambulatory supporting structure as more fully described in my copending application, Serial No. 326,299, filed March 27, 1940. The beam may be considered as an abutment forming a part of a mechanism such as that there described although an adjustable part, or, if demounted therefrom, it constitutes a self-contained rigid abutment or column.

As a means for securing various body parts to the beam either for effecting the operation thereon of various tools such as pushing and pulling instruments for reshaping the same or for in themselves effecting reshaping pressure, I provide suitable clamping mechanisms so correlated with the rest of the structure as to make it almost universal in its application within the limits of its overall dimensions. I herein provide a pair of clamps 12 of the C type, each having a body formed with a fixed jaw 14 (Fig. 2), preferably provided with a facing pad of sponge rubber or the like 16, and an opposed overhanging arm 18 which carries the clamping screw 20 adapted to be operated by tommy 22 and having swivelled on the end thereof the movable clamping jaw 24 carrying a pad 26.

In Fig. 1 the arrangement is such that the fixed jaws extend vertically to seat the converging sides of the hood which they hold, and the planes of the fixed jaws, or, otherwise expressed, the planes of the bodies of the clamps which are perpendicular thereto, lie at different angles to the length of the beam 6. In Fig. 3, on the other hand, wherein the parts are at another position, the jaws lie horizontally and, as illustrated in the figure, the bodies of the clamps are in the same plane corresponding to the plane of the slot in the beam although this is not necessary. The relative spacing of the two clamps may be varied.

To permit the adjustments described as here shown I provide on the base and the back of the clamp body respectively enlarged portions 28 and 30. Such enlargements are commonly referred to as "pads," but because the parts 16 and 26 may be so called to avoid confusion I will here refer to them as "feet." The exterior surfaces of the soles of these feet are flat and their width measured in any direction (in the case of a round member as shown the diameter thereof) is such as to span the slot, as best illustrated in Fig. 4, and rest flatwise on the face of the beam. When clamped against such face, the parts are therefore maintained in non-tipping relation. For such clamping purposes the feet have, preferably centrally therein, threaded sockets 32 adapted to receive clamp bolts 34 extended through the slot in the beam and provided with heads 36 to be set up against the lower face of the beam as by means of a range applied thereto. Obviously the clamps may swivel about the axis of the bolt. Otherwise expressed, the bolt can be set up with the body of the clamp in any desired position of angular adjustment relative to the length of the beam. Also the bolt may slide in the slot to position the clamps at any desired point along the length thereof and so control the spacing of the two clamps. The engagement of the bolt with one or the other of the feet 28 and 30 provides for an adjustment corresponding to a rotation of the rotation of the body of the clamp in its own plane. In Fig. 1 where an alligator hood is clamped in position for repair the fixed jaws 14 of the clamps extend in vertical planes which make different angles to the length of the bar to suit the work, the bolts 36 being engaged with the feet 30. In Fig. 3, on the contrary, the bolts are engaged with the feet 28 and the fixed jaws lie in a plane parallel to the face of the beam 6.

In Fig. 3 I have shown as mounted in the slot of the beam the threaded stem 38 of a padded block 40. The stem is extended through the slot in the beam and carries a nut 42. By backing off the nut a pressure, upward in the figure, may be exerted on the central portion of a member clamped laterally at either side by the two clamps 12. Alternatively the block 20 may be utilized as a fixed support to hold the work in cooperation with one of the clamps 12 while the screw-operated movable jaw of the other is utilized as a power means for exerting pressure. These are merely illustrative applications of the utilization of the parts in the correlation illustrated in Fig. 3.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A holding device for use in cooperation with a longitudinally slotted rigid beam to provide for the positioning of automobile body parts for pushing or pulling operations thereon comprising a clamp with a body of the C type having feet at its base and back, which feet have flat soles in relatively angularly disposed planes adapted to rest on the face of such a beam spanning the slot therein to resist tipping of the body in selected orientation to the length of the slot, the feet having threaded sockets adapted to receive a clamping bolt extended through the slot.

2. A holding device for use in cooperation with a longitudinally slotted rigid beam to provide for the positioning of automobile body parts for pushing or pulling operations thereon comprising a clamp with a body of the C type having feet at its base and back, which feet have flat soles in relatively angularly disposed planes adapted to rest on the face of such a beam spanning the slot therein to resist tipping of the body in selected orientation to the length of the slot, and means to press the body into firm engagement with said face of the beam comprising a spindle adapted to extend through and slide in the slot therein with an abutment to be set up against the opposite face of the beam.

3. A device for positioning automobile body parts for pushing and pulling operations thereon comprising a longitudinally slotted rigid beam and a pair of C clamps and means for pressing them in non-tilting position against the face of the beam in selected positions of angular adjustment therealong comprising clamping spindles extending through the slot of the beam and providing for swivelling movement of the planes of the clamps and constructed to engage the clamps in a plurality of positions corresponding to rotations thereof in their plane.

4. A holding device for positioning automobile body parts comprising a longitudinally slotted rigid beam and a pair of C clamps, the bodies of which have exterior flat surfaces, which surfaces have a width measured in any direction across the same greater than that of the slot to rest on the face of the beam in any angular position of the plane of the body to the length of the slot, said bodies having retainer-engaging parts in said surfaces at a plurality of points therealong which may be individually faced toward the slot on rotation of the clamp body in its own plane and retainers extending through the slot for engagement with said parts including holding elements to be set up against the opposite face of the beam.

5. A device for positioning automobile body parts for pushing and pulling operation thereon comprising a portable, longitudinally slotted, rigid beam, a pair of clamps, each comprising an upwardly facing padded jaw having a foot of a width to rest on the face of the beam and span the slot therein, a shank extending from said foot through the slot and having means to be set up on the opposite face of the beam for securing the clamp with provision for longitudinal and angular adjustment, the said upwardly facing jaw being unobstructed from three sides, an upright extending from the fourth side and having an arm overhanging the jaw, a stem threaded through said arm and having a swivelled padded jaw at its lower end opposing the fixed jaw.

WILLIAM H. FERGUSON.